Figure 1:
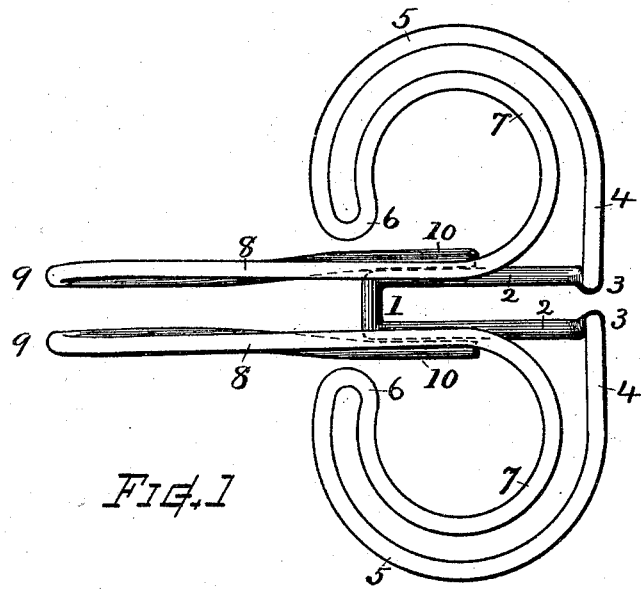

(No Model.)

T. SATHER.
BICYCLE SEAT SPRING.

No. 561,440. Patented June 2, 1896.

Witnesses.
Charles A. Bacon
Samuel R. Bartow

Inventor:
Theodore Sather,
By Chas. H. Burleigh
Attorney

UNITED STATES PATENT OFFICE.

THEODORE SATHER, OF WORCESTER, MASSACHUSETTS, ASSIGNOR OF ONE-HALF TO MADS L. JOHNSON, OF SAME PLACE.

BICYCLE SEAT-SPRING.

SPECIFICATION forming part of Letters Patent No. 561,440, dated June 2, 1896.

Application filed February 17, 1896. Serial No. 579,535. (No model.)

*To all whom it may concern:*

Be it known that I, THEODORE SATHER, a subject of the King of Sweden and Norway, residing at Worcester, in the county of Worcester and State of Massachusetts, have invented a new and useful Improvement in Bicycle Seat-Springs, of which the following, together with the accompanying drawings, is a specification sufficiently full, clear, and exact to enable persons skilled in the art to which this invention appertains to make and use the same.

The object of my present invention is to provide a seat-spring for bicycles that will afford an easy seat and comfortable support for the rider and that will yield in conformity with the movement of the limbs in working the pedals. This object I attain by a seat-spring of the peculiar construction shown in the drawings, wherein—

Figure 2:
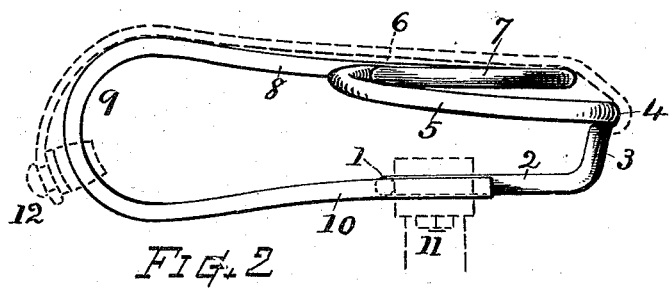
Figure 3:
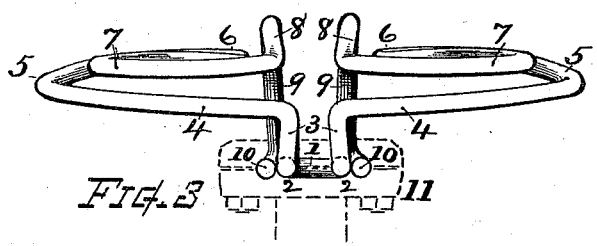

Figure 1 is a top plan view of my improved spring for bicycle-seats. Fig. 2 is a side view, and Fig. 3 is a rear view of the same.

My improved spring is formed of a rod of wire of suitable size, bent near its center to give a short horizontal part 1, and the two portions carried backward parallel with each other and at short distance apart to form the rear support-bars 2 of proper extent, and then turned upright, as at 3, for about one inch (more or less) in height. At the top of the uprights the parts are respectively bent outward laterally in opposite direction approximately perpendicular to the central vertical plane, as at 4 4, and extended with a forward and inward curve 5, of substantially circular form, along the sides of the seat and approaching the center on a slightly-rising inclination, such circular curves reaching to a point about mid-lenght of the spring, where they are formed with a backward return-bend 6, and thence with an inner circular coiled member 7 of less radius following back the outer curve 5 at a suitable distance therefrom and approximately in a horizonal plane, as shown. The portions of rod leading from the inner parts of the circles 7 are extended forward near the central plane, forming upper longitudinal members, as at 8 8, and are turned downward and backward at the fore end in round curves 9 9, the planes of which stand substantially vertical, the respective end portions 10 10 being extended backward, so as to lie adjacent to and parallel with the parts 2, said end portion 10 forming front support-bars, which are adapted, in conjunction with the portions 2, to be rigidly confined in the clamp 11, whereby the spring is attached to the seat-post of the bicycle when the spring is applied to use, as indicated by dotted lines on Figs. 2 and 3.

The leather for the seat or saddle may be attached at its forward end to a suitable clip or device 12, fixed on the vertical curved fore-end portions 9, and its rear edge attached to the laterally-extending portions 4 4 and curves 5, as indicated by dotted lines on Fig. 2, the return-bends 6 and inner circles 7 giving a yielding support beneath the two sides of the seat pad or leather at positions where the weight of the rider chiefly rests thereon.

By forming the seat-spring with the longitudinally-disposed members 2 and 8 and the oppositely-directed C-shaped loops projecting laterally from the rear parts thereof and comprising the forwardly and inwardly directed circular portions 5 and 7, joining in the free return-bend 6 near the upper longitudinal member, as shown, an independent yielding support is afforded at each side of the seat, which permits an up-and-down spring action in conformity with the movement of the rider's person while working the cycle-pedals, at the same time affording an easy and efficient support for the seat.

The rear parts of the circles 7 normally stand at somewhat higher level than the parts 4, and thereby afford comfortable yielding action at the back edge of the seat.

The bars 10 and 2, while giving solid and firm connection with the seat-post, afford some yielding and resilience at the two sides of the seat due to the torsional springing of the portions 2; but such portions 2 are prevented from rotation in the clamp by the connection at 1, which holds the parts in proper relation.

What I claim as my invention, and desire to secure by Letters Patent, is—

1. A seat-spring made of wire bent to form upper and lower longitudinal members, and having on the rear part thereof oppositely-directed laterally-projecting C-shaped loops that curve forward and inward, as shown, with their return-bends near the upper longitudinal members, said loops being free for upward and downward flexure of their forwardly-extended portions, substantially as set forth.

2. The within-described bicycle seat-spring, consisting of a wire or rod bent into the form shown, and comprising the parallel rear supports, turned upward at their rear ends, the two parts extended transversely outward therefrom in opposite directions, and thence bent forwardly and inwardly in slightly-rising circular curves that approach the central part of the seat, there formed, each with a backward return-bend and an inner circular coil member, approximately in horizontal position, the two portions of rod leading from said inner coils extended forward nearly adjacent to each other and turned downward at the fore end in approximately vertical planes, their end portions extending backward adjacent to said rear supports, and adapted for retention therewith, in the seat-post connection, all substantially as shown and for the purpose set forth.

Witness my hand this 14th day of February, 1896.

THEODORE SATHER.

Witnesses:
CHAS. H. BURLEIGH,
PEDER BUNDGAARD.